United States Patent [19]
Liu

[11] Patent Number: 5,619,402
[45] Date of Patent: Apr. 8, 1997

[54] HIGHER-EFFICIENCY COLD-CATHODE FLUORESCENT LAMP POWER SUPPLY

[75] Inventor: Kwang H. Liu, Sunnyvale, Calif.

[73] Assignee: O₂ Micro, Inc., Santa Clara, Calif.

[21] Appl. No.: 633,221

[22] Filed: Apr. 16, 1996

[51] Int. Cl.⁶ .................................................. H02M 3/335
[52] U.S. Cl. ............................... 363/20; 363/97; 363/131
[58] Field of Search .............................. 363/18–21, 56, 363/95, 97, 98, 131, 132; 315/246, 224, 276, 291

[56] References Cited

U.S. PATENT DOCUMENTS

| | | | |
|---|---|---|---|
| 3,596,165 | 7/1971 | Andrews | 321/2 |
| 4,441,146 | 4/1984 | Vinciarelli | 363/20 |
| 4,692,851 | 9/1987 | Attwood | 363/16 |
| 4,763,237 | 8/1988 | Wieczorek | 363/20 |
| 4,809,148 | 2/1989 | Barn | 363/20 |
| 4,959,764 | 9/1990 | Bassett | 363/16 |
| 5,019,749 | 5/1991 | Ito | 315/224 |
| 5,099,406 | 3/1992 | Harada et al. | 363/20 |
| 5,111,372 | 5/1992 | Kameyama et al. | 363/20 |
| 5,140,510 | 8/1992 | Myers | 363/20 |
| 5,146,394 | 9/1992 | Ishii et al. | 363/21 |
| 5,184,289 | 2/1993 | Bonnet et al. | 363/20 |
| 5,206,800 | 4/1993 | Smith | 363/21 |
| 5,430,633 | 7/1995 | Smith | 363/20 |
| 5,490,052 | 2/1996 | Yoshida et al. | 363/15 |
| 5,535,112 | 7/1996 | Vazquez Lopez et al. | 363/20 |

*Primary Examiner*—Peter S. Wong
*Assistant Examiner*—Adolf Berhane
*Attorney, Agent, or Firm*—Donald E. Schreiber

[57] ABSTRACT

A switched-mode power supply for energizing a cold-cathode fluorescent lamp ("CCFL") includes a first semiconductor switch connects in series with a primary winding of a step-up transformer. The primary winding and a secondary winding, having many more turns than the primary winding, are disposed about a transformer core which has a linear magnetic permeability. A series connected second semiconductor switch and capacitor connect in parallel with the transformer's primary winding. A controller circuit transmits signals to turn the switches on and off. The controller circuit turns the first and second semiconductor switches on and off at a frequency that is higher than a resonant frequency of a parallel resonant circuit formed by the primary inductance of the transformer and capacitance of the capacitor. A decoupling capacitor connects in series to a first end of the transformer's secondary winding. A second terminal of the decoupling capacitor and a second end of the secondary winding provide ac power output terminals for the switched-mode power supply across which a CCFL may be connected.

20 Claims, 2 Drawing Sheets

HIGHER-EFFICIENCY COLD-CATHODE FLUORESCENT LAMP POWER SUPPLY

BACKGROUND OF THE INVENTION

1. Field of the Invention

The present invention relates generally to power supplies for a cold-cathode fluorescent lamp ("CCFL") that may be used for back lighting a display of a portable device, and, more particularly, to a switched-mode inverter circuit which uses a capacitor to reset a transformer's core, and uses its magnetizing inductance to store and transfer energy during negative half-cycles.

2. Description of the Prior Art

Similar to a conventional hot-cathode fluorescent lamp ("FL") used for office and home lighting, CCFLs are high-efficiency, long-life light sources. By comparison, incandescent lamps have efficiency in the range of 15 to 25 lumens per watt, while both FLs and CCFLs have efficiency in the range of 40 to 60 lumens per watt. Furthermore, the average life of an incandescent lamp is only about 1,000 hours. However, FLs and CCFLs, on average, last for 10,000 hours or more.

The main difference between a hot-cathode FL and a CCFL is that the CCFL omits filaments that are included in a FL. Due to their simpler mechanical construction and high efficiency, miniature CCFLs are generally used as a source of back lighting for Liquid Crystal Displays ("LCDs"). LCDs, whether color or monochrome, are widely used as displays in portable computers and televisions, and in instrument panels of airplanes and automobiles.

However, starting and operating a CCFL requires a high alternating current ("ac") voltage. Typical starting voltage is around 1,000 volts AC ("Vac"), and typical operating voltage is about 600 Vac. To generate such a high ac voltage from a dc power source such as a rechargeable battery, portable computers and televisions, and instrument panels, include a dc-to-ac inverter having a step-up transformer.

Presently, the majority of CCFL inverter circuits are based on a circuit generally known as the current-fed Royer circuit. A Royer circuit, referred to by the general reference character 10 in FIG. 1, may include two NPN bipolar transistors 12 and 14 together with a saturable-core transformer 16. Collectors 18 of each of the transistors 12 and 14 connect respectively to opposite ends of a primary winding 22 of the transformer 16. A center-tap 24 of the transformer 16 connects to a positive terminal 26 of a battery 28. Emitters 32 of the transistors 12 and 14 connect in parallel to circuit ground of the Royer circuit 10, to which a negative terminal 34 of the battery 28 also connects. A feedback secondary winding 36 of the transformer 16 connects between bases 38 of the transistors 12 and 14. A bias resistor 42 connects between the base 38 of the transistor 12 and the positive terminal 26 of the battery 28. A CCFL 44 and a decoupling capacitor 46 connect in series across a power output secondary 48 of the transformer 16. The non-linear current-gain characteristics of the bipolar transistors 12 and 14 in conjunction with the non-linear permeability of the saturable-core transformer 16 cause the Royer circuit 10 to be self-oscillating. Consequently, the Royer circuit 10 omits any external clock or driver circuit for the transistors 12 and 14.

The Royer circuit 10 is basically a fixed voltage inverter. That is, the Royer circuit 10 steps-up voltage with a constant ratio that is proportional to the number of turns on the secondary winding divided by the number of turns on the primary winding. Consequently, the Royer circuit cannot maintain a constant output voltage if input voltage or load current varies. Therefore, a regulator circuit is generally used to supply electrical power to the Royer circuit. The regulator circuit, normally a switch mode step-down converter, delivers constant input power to the Royer circuit so the output load, e.g. a CCFL, receives constant electrical power.

FIG. 2 depicts a typical current-fed Royer circuit combined with a regulator circuit. Those elements depicted in FIG. 2 that are common to the Royer circuit depicted in FIG. 1 carry the same reference numeral distinguished by a prime ("'") designation. The regulator circuit depicted in FIG. 2 includes a PNP power control transistor 52, a free-wheeling diode 54, an inductor 56, a current-sensing resistor 58, and a switching regulator controller 62. An emitter 64 of the power control transistor 52 connects to the positive terminal 26' of the battery 28'. A collector 66 of the power control transistor 52 connects in series with the inductor 56 to the center-tap 24' of the primary winding 22' of the transformer 16', and to a cathode 68 of the free-wheeling diode 54. An anode 72 of the free-wheeling diode 54 connects to circuit ground. The current-sensing resistor 58 connects in series between the emitters 32' of the transistors 12 and 14 and circuit ground. A current-sensing input-terminal 74 of the switching regulator controller 62, which may be a LT1182 or a LT1183 CCFL/LCD Contrast Dual Switching Regulator integrated circuit ("IC") marketed by Linear Technology of Milpitas, Calif., connects to a juncture between the emitters 32' and the current-sensing resistor 58. A power-input terminal 76 of the switching regulator controller 62 connects to the positive terminal 26' of the battery 28'. An output terminal 78 of the switching regulator controller 62 connects to a base 82 of the power control transistor 52 to alternatively first turn the power control transistor 52 on, and then turn the power control transistor 52 off.

Since the Royer circuit 10' depicted in FIG. 2 uses two stages of power conversion, i.e. the regulator connected in series with the current-fed Royer circuit of FIG. 1, its electrical efficiency is comparatively low, i.e. approximately 70–80%. Since LCD back lighting consumes a significant amount of electrical power in portable computers and televisions, i.e. approximately 20% to 30%, excessive power consumption by the Royer circuit significantly reduces the amount of operating time provided by a fully charged battery. Furthermore, the transformer 16 or 16' requires four windings, two of which connect in series to provide the center-tap 24 or 24' for the primary winding 22 or 22'. Because of the four-winding structure, and the high voltage generated across the power output secondary 48 or 48', the transformer 16 or 16' is comparatively difficult to manufacture, and is prone to arcing failures.

SUMMARY OF THE INVENTION

An object of the present invention is to provide an improved power supply for CCFLs.

Another object of the present invention is to provide a more electrically efficient power supply for CCFLs.

.Another object of the present invention is to provide a simpler power supply for CCFLs.

Another object of the present invention is to provide a power supply for CCFLs that has only a single stage of electrical power conversion.

Another object of the present invention is to provide a higher reliability, cost effective power supply for CCFLs.

Another object of the present invention is to provide a power supply for CCFLs that has fewer components.

Another object of the present invention is to provide a lower cost power supply for CCFLs.

Another object of the present invention is to reduce the amount of electrical power consumed in LCD back lighting.

Briefly, the present invention is a switched-mode power supply for energizing a cold-cathode fluorescent lamp ("CCFL"). The switched-mode power supply converts a comparatively low, direct current ("dc") input voltage into high, alternating current ("ac") output voltage that may be supplied to a CCFL. The switched-mode power supply includes a first semiconductor switch having a source terminal, that may also be called a first principal terminal, that connects to circuit ground of the switched-mode power supply. A drain terminal, that may also be called a second principal terminal, of the first semiconductor switch connects to a primary winding of a step-up transformer. The primary winding and a secondary winding of the transformer are preferably disposed about a core having a linear magnetic permeability. The secondary winding has a number of turns that is at least ten times greater, and preferably fifty to one-hundred times greater, than a number of turns of the primary winding. The primary winding has a second end that is coupled to a power source terminal for the switched-mode power supply.

A source terminal, that may also be called a first principal terminal, of a second semiconductor switch preferably connects both to the power source terminal and to the second end of the primary winding of the transformer. A capacitor, also included in the switched-mode power supply, has a first terminal that connects to a drain terminal, that may also be called a second principal terminal, of the second semiconductor switch. A second terminal of the capacitor preferably connects to the drain terminal of the first semiconductor switch, and to the first end of the primary winding of the transformer. In this way the series connected second semiconductor switch and capacitor connect in parallel with the primary winding of the transformer.

A controller circuit, included in the switched-mode power supply, transmits control signals to the first and second semiconductor switches for turning the switches alternatively on and off. While the second semiconductor switch is turned-off and the first semiconductor switch is turned-on, a current flows through the primary winding of the transformer and through the first semiconductor switch. While the first semiconductor is turned-off and the second semiconductor switch is turned-on, a current flows through the primary winding and through the series connected second semiconductor switch and capacitor. The controller circuit turns the first and second semiconductor switches on and off at a frequency that is higher than a resonant frequency of a parallel resonant circuit formed by the primary inductance of the transformer and capacitance of the capacitor.

A decoupling capacitor, included in the switched-mode power supply, connects in series to a first end of the transformer's secondary winding. A second terminal of the decoupling capacitor and a second end of the secondary winding provide ac power output terminals for the switched-mode power supply across which a CCFL may be connected.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 3:
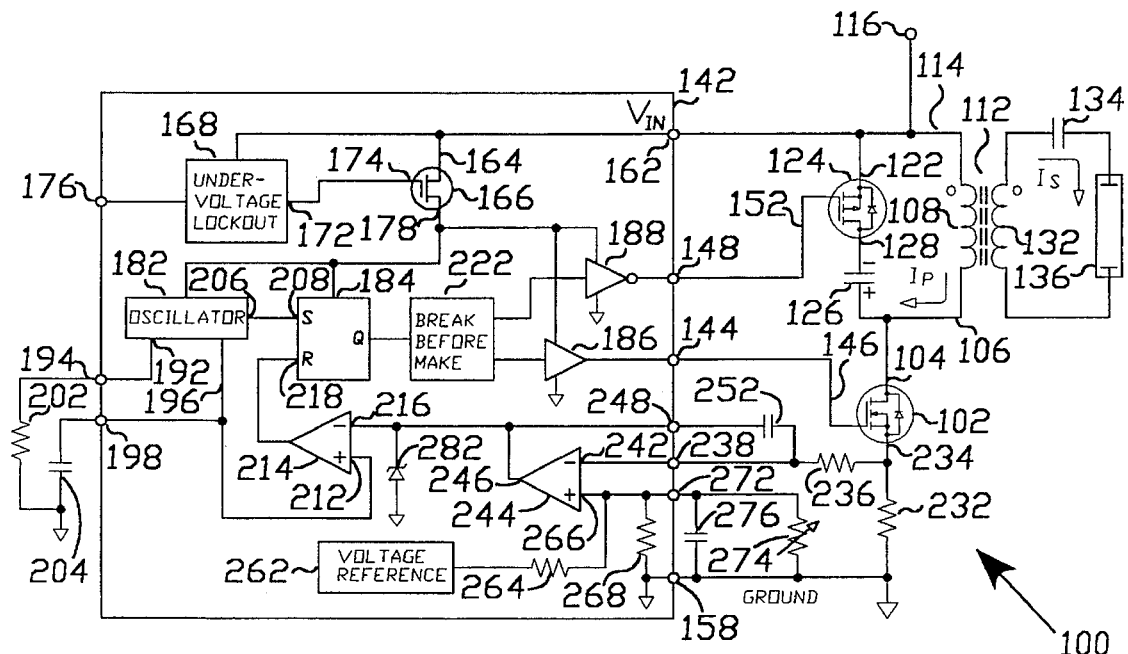
FIG. 3 is a circuit diagram depicting a CCFL power supply in accordance with the present invention.

FIG. 3 illustrates a preferred embodiment of a switched-mode CCFL power supply in accordance with the present invention referred to by the general reference character 100. The CCFL power supply 100 includes a power N-channel metal-oxide-silicon field effect transistor ("MOSFET") gate-controlled first semiconductor switch 102. The first semiconductor switch 102 includes a drain terminal 104 which connects to a first end 106 of a primary winding 108 of a step-up transformer 112. A second end 114 of the primary winding 108 connects to a positive voltage power-source terminal 116 through which a voltage $V_{IN}$, usually ranging between five (5) and twenty-four (24) volts dc, is supplied to the CCFL power supply 100. A source terminal 122 of a P-channel MOSFET gate-controlled second semiconductor switch 124 also connects to the power-source terminal 116. A capacitor 126 couples a drain terminal 128 of the second semiconductor switch 124 both to the drain terminal 104 of the first semiconductor switch 102, and also to the primary winding 108 of the step-up transformer 112. The capacitor 126 is oriented so its positive polarity terminal connects to the drain terminal 104 of the first semiconductor switch 102. Both the first semiconductor switch 102 and the second semiconductor switch 124 respectively include an integral reverse diode. The first semiconductor switch 102 and the second semiconductor switch 124 are preferably model Si9939DY MOSFETs marketed by Siliconix, Inc. of Santa Clara, Calif.

Similar to the Royer circuit 10, a secondary winding 132 of the step-up transformer 112 connects in series with a decoupling capacitor 134. A CCFL 136 connects in series with a terminal of the decoupling capacitor 134 and an end of the secondary winding 132, which constitute power output terminals for the CCFL power supply 100. However, in contrast to the non-linear permeability of the saturable-core material that must be employed for the transformer 16 in the prior art Royer circuit 10, a linear permeability ferrite material that does not saturate during normal operation of the CCFL power supply 100 forms a core of the step-up transformer 112. The step-up transformer 112 has a ratio between the number of turns in the secondary winding 132, $N_2$, and the number of turns in the primary winding 108, $N_1$, that is at least 10:1, and generally ranges between 50:1 to 100:1.

The CCFL power supply 100 preferably employs a pulse-width-modulation controller IC 142 for supplying a N-channel MOSFET driving signal from a N-channel drive output pin 144 to a gate terminal 146 of the first semiconductor switch 102 (that may also be called a control terminal of the first semiconductor switch 102), and a P-channel MOSFET driving signal from a P-channel drive output pin 148 to a gate terminal 152 of the second semiconductor switch 124 (that may also be called a control terminal of the second semiconductor switch 124). In addition to providing driving signals to the first semiconductor switch 102 and to the second semiconductor switch 124, as explained in greater detail below, the controller IC 142 also provides other functions such as current sensing, feedback compensation, dimming control, duty cycle limit, and a clock oscillator needed for operation of the CCFL power supply 100.

The controller IC 142 includes a ground pin 158 that electrically connects the controller IC 142 to circuit ground, and a voltage input-pin 162 that connects the controller IC 142 to the power-source terminal 116. Within the controller IC 142, the voltage input-pin 162 connects to a source terminal 164 of a field effect transistor ("FET") 166, and to an under-voltage lockout circuit 168. An output terminal 172 of the under-voltage lockout circuit 168 connects to a gate terminal 174 of the FET 166. While the voltage supplied to the voltage input-pin 162 of the controller IC 142 exceeds a threshold established by the under-voltage lockout circuit 168, a signal from the output terminal 172 supplied to the gate terminal 174 keeps the FET 166 turned-on. However, if the voltage supplied to the voltage input-pin 162 of the controller IC 142 becomes less than the pre-established threshold that is less than $V_{IN}$, then the signal from the output terminal 172 supplied to the gate terminal 174 turns-off the FET 166 thereby halting operation of the controller IC 142.

The controller IC 142 also includes an enable pin 176 that connects within the controller IC 142 to the under-voltage lockout circuit 168. Applying a specified voltage to the enable pin 176 causes the under-voltage lockout circuit 168 to turn-off the FET 166 even if the voltage supplied to the voltage input-pin 162 exceeds the threshold pre-established by the under-voltage lockout circuit 168. The enable pin 176 permits an electrical power management computer program, executed by a central processing unit ("CPU") included in a portable computer, to conveniently manage the computer's electrical power consumption by electrically turning-off and turning-on LCD backlighting.

If the FET 166 is turned-on, a drain terminal 178 of the FET 166 supplies electrical power to an oscillator 182, to a set-reset flip-flop 184, to a N-channel current amplifier 186, and to an inverting P-channel current amplifier 188. A resistor terminal 192 of the oscillator 182 connects to a resistor pin 194 of the controller IC 142. A capacitor terminal 196 of the oscillator 182 connects to a capacitor pin 198 of the controller IC 142. A timing resistor 202 and a timing capacitor 204 connect respectively between the resistor pin 194 and the capacitor pin 198 and circuit ground. The resistance of the timing resistor 202 and the capacitance of the timing capacitor 204 are selected so the oscillator 182 oscillates at a frequency of approximately 100 to 150 kilohertz ("KHz").

The oscillator 182 supplies a signal at this 100 to 150 KHz frequency from an output terminal 206 to a set input-terminal 208 for setting the set-reset flip-flop 184. The capacitor terminal 196 of the oscillator 182 and the capacitor pin 198 of the controller IC 142 also connect to a non-inverting input-terminal 212 of a comparator 214. When, due to the normal operation of the oscillator 182, a sawtooth waveform present at the capacitor pin 198 of the controller IC 142 exceeds a voltage present at an inverting input 216 of the comparator 214, the comparator 214 transmits an output signal to a reset input-terminal 218 that resets the set-reset flip-flop 184. In this way, the oscillator 182 and the comparator 214 alternatively set and reset the set-reset flip-flop 184 at the operating frequency of the oscillator 182.

The set-reset flip-flop 184 supplies an output signal to an input of a break-before-make circuit 222. The break-before-make circuit 222 supplies separate output signals to inputs respectively of the N-channel current amplifier 186 and of the P-channel current amplifier 188. Output signals from the N-channel current amplifier 186 and the P-channel current amplifier 188 are respectively coupled to the N-channel drive output pin 144 and the P-channel drive output pin 148 for supplying driving signals to the gate terminals 146 and 152 of the gate-controlled semiconductor switches 102 and 124.

Driven by signals from the controller IC 142, the first semiconductor switch 102 and the second semiconductor switch 124 operate in a complementary duty-cycle mode. Consequently, the driving signals supplied to the gate terminals 146 and 152 respectively of the gate-controlled semiconductor switches 102 and 124 by the controller IC 142 alternatively turns-on one switch 102 or 124 while turning-off the other switch 102 or 124. The break-before-make circuit 222 included in the controller IC 142 ensures that both gate-controlled semiconductor switches 102 and 124 are not both turned-on concurrently.

A current-sensing resistor 232 couples a source terminal 234 of the first semiconductor switch 102 to circuit ground. A voltage present on the current-sensing resistor 232 is supplied through a feedback resistor 236 to a feedback-voltage input-pin 238 of the controller IC 142. Within the controller IC 142, this feedback voltage is supplied to an inverting input-terminal 242 of an error amplifier 244. An output terminal 246 of the error amplifier 244 is coupled within the controller IC 142 to a feedback-capacitor pin 248 of the controller IC 142. A feedback capacitor 252 is coupled between the feedback-capacitor pin 248 and the feedback-voltage input-pin 238. Configured in this way, the error amplifier 244 operates as an integrator for the feedback voltage signal supplied to the feedback resistor 236. In addition to the negative feedback provided by the feedback capacitor 252 that is depicted in FIG. 3, the error amplifier 244 also includes internal resistive feedback, not illustrated in FIG. 3, which stabilizes the amplifier's DC output voltage and limits the maximum DC gain of the error amplifier 244. Consequently, the output signal from the error amplifier 244 responds relatively slowly, e.g. in milliseconds, to comparatively long-term changes in the average voltage appearing across the current-sensing resistor 232.

The controller IC 142 also includes a voltage reference 262. The voltage reference 262 applies a constant voltage to a first terminal of a first voltage-divider resistor 264 that has second terminal connected to a non-inverting input-terminal 266 of the error amplifier 244. Connected within the controller IC 142 between the non-inverting input-terminal 266 and circuit ground is a second voltage-divider resistor 268. A dimming-control input-pin 272 of the controller IC 142 connects the resistor 268 in parallel both with a LCD dimming-control variable-resistor 274 and with a filter capacitor 276. The parallel connected resistors 268 and 274 connect in series with the resistor 264 to divide the constant voltage supplied by the voltage reference 262. The error amplifier 244 compares the voltage supplied by this voltage divider to the non-inverting input-terminal 266 with the feedback voltage which the inverting input-terminal 242 receives from the current-sensing resistor 232. The output signal from the output terminal 246 of the error amplifier 244, which is proportional to the difference between the voltages applied to the inverting input-terminal 242 and the non-inverting input-terminal 266, is supplied as a reference voltage to the inverting input 216 of the comparator 214. Thus, the voltage of the signal produced by the error amplifier 244 controls the location along the sawtooth waveform supplied to the non-inverting input-terminal 212 at which the output signal from the comparator 214 resets the set-reset flip-flop 184.

The controller IC 142 also includes a zener diode 282 connected between the inverting input 216 of the comparator 214 and circuit ground. The breakdown voltage of the zener diode 282 is selected so the maximum voltage applied to the inverting input 216 of the comparator 214 restricts the duty cycle of the first semiconductor switch 102 to less than a pre-established maximum of 67%. That is, the zener diode 282 limits the voltage applied to the inverting input 216 of the comparator 214 to a maximum value which causes the on-interval for the first semiconductor switch 102 to be no more than twice as long as the on-interval for the second semiconductor switch 124.

Figure 4:
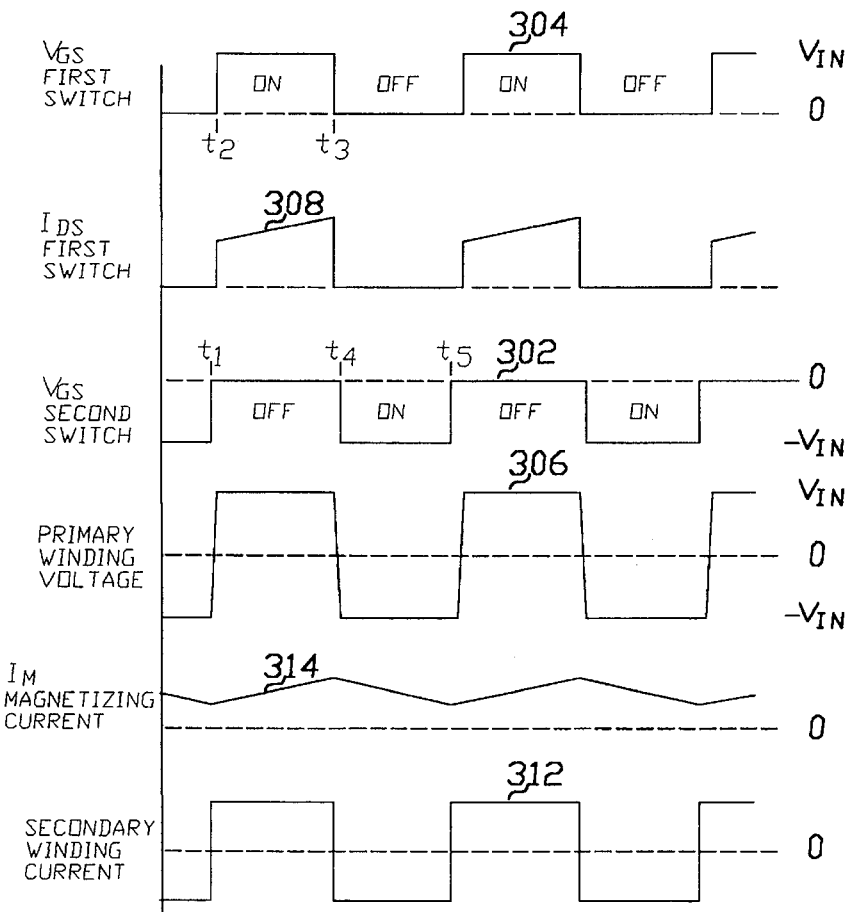
FIG. 4 is a diagram depicting various electrical waveforms that occur during operation the CCFL power depicted in FIG. 3.

Referring now to FIG. 4, time $t_1$ on a second-switch gate-waveform 302, that depicts a voltage between the gate terminal 152 and the drain terminal 128 of the second semiconductor switch 124, marks a beginning of a positive half-cycle of the driving signals applied to the gate terminals 146 and 152 of the gate-controlled semiconductor switches 102 and 124. At time $t_1$, the second semiconductor switch 124 is turned-off by the signal supplied from the P-channel drive output pin 148 of the second semiconductor switch 124. Shortly thereafter, at time $t_2$ on a first-switch gate-waveform 304 that depicts a voltage between the gate terminal 146 and the source terminal 234 of the first semiconductor switch 102, the signal transmitted from the N-channel drive output pin 144 of the controller IC 142 turns-on the first semiconductor switch 102. As depicted by a primary-winding voltage-waveform 306, turning-on of the first semiconductor switch 102 at time $t_2$ applies a positive voltage across the primary winding 108 from the first end 106 to the second end 114. Application of this voltage across the primary winding 108 causes current to flow through the primary winding 108 and the first semiconductor switch 102, as indicated by an arrow in FIG. 3 labeled $I_P$, and as illustrated by the first-switch drain-to-source current waveform 308 $I_{DS}$ in FIG. 4.

Application of a voltage across and current flowing through the primary winding 108 induces a voltage .across the secondary winding 132 of the step-up transformer 112. The voltage across the secondary winding 132 is applied across the series connected decoupling capacitor 134 and CCFL 136. The voltage across the secondary winding 132 causes current to flow through the series connected decoupling capacitor 134 and CCFL 136 as indicated by an arrow $I_S$ in FIG. 3, and in FIG. 4 by a secondary-winding current-waveform 312. The current $I_S$ continues to flow through the secondary winding 132 of the step-up transformer 112 from time $t_2$ to a time $t_3$ on the first-switch gate-waveform 304 of FIG. 4.

A fraction of the current flowing through the first semiconductor switch 102 constitutes a magnetization current $I_M$ for a core of the step-up transformer 112. Starting at time $t_2$, the magnetization current $I_M$, depicted in FIG. 4 by a magnetizing current-waveform 314, increases at a rate $V_{IN}/L_p$, where $L_p$ is an inductance of the primary winding 108 of the step-up transformer 112. During the positive half-cycle, the current flowing through the first semiconductor switch 102 $I_P$, depicted by the first-switch drain-to-source current waveform 308, equals the sum of the magnetization current $I_M$ plus the reflected current flowing through CCFL 136, i.e. $I_P = I_M + I_S \times (N_2/N_1)$ where $N_w$ wand $N_1$ are respectively the number of turns in the primary winding 108 and in the secondary winding 132 of the step-up transformer 112.

At time $t_3$ of the first-switch gate-waveform 304, the first semiconductor switch 102 turns-off marking a beginning of a negative half-cycle of voltage across the primary winding 108. Instantaneously at time $t_3$, the voltages across the primary winding 108 and the secondary winding 132 reverse as illustrated by the primary-winding voltage-waveform 306 in FIG. 4. Reversal of the voltage across the primary winding 108 causes current to flow in a loop through the series connected capacitor 126 and second semiconductor switch 124, initially through the reverse diode integrated into the second semiconductor switch 124. At time $t_3$ the magnetization current $I_M$ begins to decrease as indicated by the magnetizing current-waveform 314. Shortly after $t_3$, at time $t_4$ on the second-switch gate-waveform 302, the second semiconductor switch 124 turns-on. When the second semiconductor switch 124 turns-on, most of the current flowing through the primary winding 108 of the step-up transformer 112 then flows from the drain terminal 128 to the source terminal 122 of the second semiconductor switch 124, rather than through the reverse diode integrated into the second semiconductor switch 124.

Throughout the entire negative half-cycle from $t_3$ to $t_4$, part of the magnetization current $I_M$ from the primary winding 108 flows through the series connected capacitor 126 and second semiconductor switch 124. During steady-state operation of the CCFL power supply 100, the voltage across the capacitor 126 becomes an approximately constant dc value. Under such circumstances, the steady-state voltage across the capacitor 126 may be calculated as equal to $-V_{IN}*D/(1-D)$, where D is the turn-on duty-cycle of the first semiconductor switch 102. During the negative half cycle, essentially all the current flowing through the CCFL 136 is supported by the magnetization current $I_M$ of the step-up transformer 112.

Time $t_5$ on the second-switch gate-waveform 302 marks an end of the negative half-cycle of voltage across the primary winding 108, and indicates the instant at which the second semiconductor switch 124 turns-off. Turning-off of the second semiconductor switch 124 restores the operating state of the CCFL power :supply 100 to that existing at the time $T_1$.

One method for analyzing operation of the CCFL power supply 100 during the negative half-cycles, i.e. from time $t_3$–$t_4$ to time $t_5$–$t_1$, considers the inductance of the step-up transformer 112 and the capacitance of the capacitor 126 as forming a parallel resonant circuit with the CCFL 136 being a load connected in parallel both with the primary winding 108 and with the capacitor 126. Analyzed in this way, the resonant frequency of the step-up transformer 112 and the capacitor 126 must be much lower than the actual operating frequency of the CCFL power supply 100. Preferably the inductance of the step-up transformer 112 and the capacitance of the capacitor 126 are selected to establish a resonant frequency such that operating frequency of the CCFL power supply 100 is preferably seven (7) to ten (10) times greater than the resonant frequency. During the positive half-cycle, approximately one-half of the current flowing through the primary winding 108 $I_P$ powers the operation of the CCFL 136, while the other half of $I_P$ increases energy stored in the inductance of the step-up transformer 112. During the negative half-cycle, energy stored in the inductance of the step-up transformer 112 powers the operation of the CCFL 136. Thus, the CCFL power supply 100 supplies power to the CCFL 136, i.e. to the load of the step-up transformer 112, both during each positive half-cycle and during each negative half-cycle in the operation of the CCFL power supply 100.

The amount of power which the CCFL power supply 100 supplies to the CCFL 136 is proportional to the voltage applied between the power-source terminal 116 and circuit ground multiplied by the average current flowing from the power-source terminal 116 to circuit ground. The average voltage applied to the feedback resistor 236 at the junction of the source terminal 234 of the first semiconductor switch 102 with the current-sensing resistor 232 is proportional to the current flowing from the power-source terminal 116 to circuit ground. Operation of the controller IC 142 adjusts the respective duty cycles of the gate-controlled semiconductor switches 102 and 124 to stabilize the average current flowing through the current-sensing resistor 232, and, correspondingly, the average current flowing between the power-source terminal 116 and circuit ground through the primary winding 108 of the step-up transformer 112. The relative amount of the current flowing through the current-sensing resistor 232 may be varied by adjusting the resistance of the LCD dimming-control variable-resistor 274. Changing the resistance of the LCD dimming-control variable-resistor 274 either increases or decreases the magnitude of the feedback stabilized average current flowing through the current-sensing resistor 232, i.e. the average current flowing between the power-source terminal 116 and circuit ground through the primary winding 108 of the step-up transformer 112.

Figure 1:
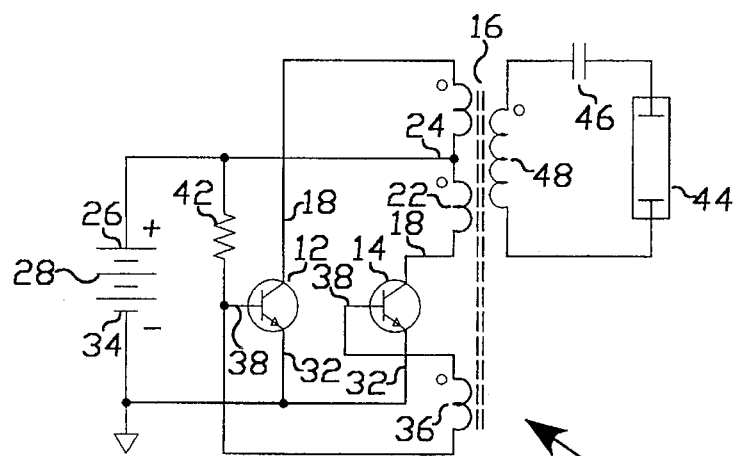
FIG. 1 is a circuit diagram depicting a Royer circuit in accordance with the prior art.
Figure 2:
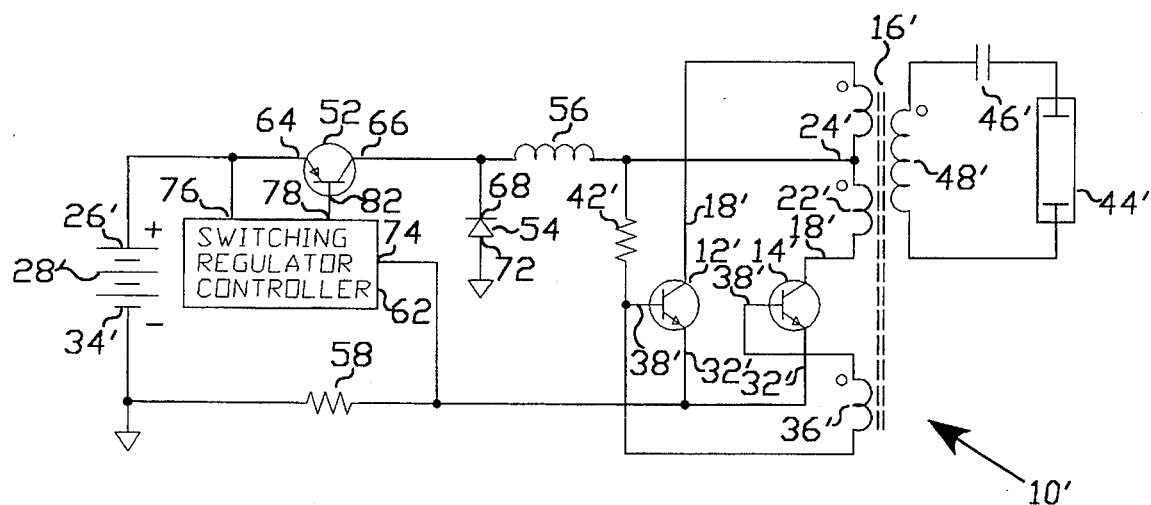
FIG. 2 is circuit diagram depicting a current-fed Royer circuit including an input-power regulator circuit in accordance with the prior art.

Because virtually all of the energy supplied to the CCFL power supply 100, except for energy dissipated in resistive heating of electronic components and energy lost through lossy coupling within components such as the step-up transformer 112, is supplied directly to the CCFL 136, the overall electrical efficiency of the CCFL power supply 100 is significantly higher than the electrical efficiency of the current-fed Royer circuit 10' depicted in FIG. 2. Thus, while as stated above the current-fed Royer circuit 10' has an efficiency of approximately 70–80%, a properly constructed CCFL power supply 100 in accordance with the present invention has an efficiency of approximately 90%. Since LCD backlighting consumes approximately 20% to 30% of the electrical power required to operate a portable computer, a 10% to 20% decrease in the amount of power required to backlight an LCD increases the operating time provided by a fully charged battery by approximately 2% to 6%.

Although the present invention has been described in terms of the presently preferred embodiment, it is to be understood that such disclosure is purely illustrative and is not to be interpreted as limiting. Thus, for example, while a CCFL power supply 100 in accordance with the present invention preferably includes MOSFETs for the gate-controlled semiconductor switches 102 and 124, a circuit in accordance with the present invention could be implemented using bipolar transistors that are connected in parallel with discrete diodes. In such a bipolar transistor implementation of the CCFL power supply 100, the MOSFET gate-controlled semiconductor switches 102 and 124 would be replaced by bipolar NPN transistors. Accordingly, the source of the MOSFET would be exchanged for the emitter of a bipolar transistor, the gate of the MOSFET would be exchanged for the base of a bipolar transistor, and the drain of the MOSFET would be exchanged for the collector of the bipolar transistor.

Analogously, the order of the series connected second semiconductor switch 124 and capacitor 126 could be reversed from that disclosed above for the preferred embodiment, although a more complicated controller IC 142 would then be required for supplying the control signal to the gate terminal 152 of the second semiconductor switch 124. Similarly, while the core of the step-up transformer 112 is preferably made from a linear permeability ferrite material, it could also be made from a non-linear permeability ferrite material, although the use of such a non-linear permeability material would reduce the conversion efficiency of the CCFL power supply 100. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A switched-mode power supply for energizing a cold-cathode fluorescent lamp ("CCFL"), the switched-mode power supply converting a comparatively low, direct current ("dc") input voltage into high, alternating current ("ac") output voltage that may be supplied to a CCFL, the switched-mode power supply comprising:

a first semiconductor switch having a first principal terminal, a second principal terminal, and a control terminal; the first principal terminal being coupled to a circuit ground of the switched-mode power supply;

a step-up transformer having a primary winding that has a primary inductance, and a secondary winding; the primary winding and the secondary winding being disposed about a core; the secondary winding having a number of turns that is at least ten times greater than a number of turns of the primary winding; a first end of said primary winding connecting to the second principal terminal of said first semiconductor switch, whereby said transformer and said first semiconductor switch connect in series, and the primary winding having a second end that is coupled to a power source terminal for the switched-mode power supply;

a second semiconductor switch having a first principal terminal, a second principal terminal, and a control terminal; and a capacitor having a capacitance and a first terminal that connects to one of the principal terminals of said second semiconductor switch, whereby said second semiconductor switch and said capacitor connect in series; the other principal terminal of said second semiconductor switch and a second terminal of said capacitor connecting respectively to the second principal terminal of said first semiconductor switch and to the second end of the primary winding of said transformer, whereby said series connected second semiconductor switch and capacitor connect in parallel with the primary winding of said transformer; the combined primary inductance of said transformer and capacitance of said capacitor having a resonant frequency;

a controller circuit having a first switch-driving output-terminal that connects to the control terminal of said first semiconductor switch, and having a second switch-driving output-terminal that connects to the control terminal of said second semiconductor switch, said controller circuit transmitting signals to said first semiconductor switch and to said second semiconductor switch for turning said first semiconductor switch first on and then off while concurrently turning said second semiconductor switch first off and then on thereby establishing duty cycles respectively for said first and second semiconductor switches; whereby periodically a current flows through the primary winding of said transformer and through said first semiconductor switch while said first semiconductor switch is turned-on and said second semiconductor switch is turned-off, and whereby a current flows through the primary winding and through said series connected second semiconductor switch and capacitor while said second semiconductor switch is turned-on and said first semiconductor switch is turned-off; said controller circuit turning said first and second semiconductor switches on and off at a frequency that is higher than the resonant frequency of the combined primary inductance of said transformer and capacitance of said capacitor; and a decoupling capacitor having a first terminal that connects to a first end of the secondary winding of said transformer, whereby the decoupling capacitor and the secondary winding are connected in series; said decoupling capacitor having a second terminal and the secondary winding having a second end that provide ac power output terminals of the switched-mode power supply across which a CCFL may be connected.

2. The switched-mode power supply of claim 1 wherein said first semiconductor switch and said second semiconductor switch each also respectively include a diode having an anode that connects to the first principal terminal of said gate-controlled semiconductor switch, and said diode included in said gate-controlled semiconductor switch also having a cathode that connects to the second principal terminal of said gate-controlled semiconductor switch.

3. The switched-mode power supply of claim 1 wherein the frequency at which said controller circuit switches said first and second semiconductor switches turn on and off is at least four times higher than the resonant frequency of the combined primary inductance of said transformer and capacitance of said capacitor.

4. The switched-mode power supply of claim 3 wherein the frequency at which said controller circuit switches said first and second semiconductor switches turn on and off is at least seven times higher than the resonant frequency of the combined primary inductance of said transformer and capacitance of said capacitor.

5. The switched-mode power supply of claim 1 further comprising a CCFL connected to the power output terminals of the switched-mode power supply.

6. The switched-mode power supply of claim 1 wherein the number of turns in the secondary winding of said transformer is at least fifty times greater than the number of turns in the primary winding.

7. The switched-mode power supply of claim 6 wherein the number of turns in the secondary winding of said transformer is at least eighty times greater than the number of turns in the primary winding.

8. The switched-mode power supply of claim 1 wherein said controller circuit includes an under-voltage lockout circuit for halting operation of said controller circuit if a voltage supplied to said controller circuit is less than a pre-established threshold.

9. The switched-mode power supply of claim 1 wherein said controller circuit includes a break-before-make circuit which ensures that both said first and second semiconductor switches are not both turned-on concurrently.

10. The switched-mode power supply of claim 1 wherein, while said first semiconductor switch is turned-on,, current flowing through the primary winding of said transformer is sensed and supplied to said controller circuit, and wherein said controller circuit adjusts respective duty cycles of said first and second semiconductor switches to stabilize an average current flowing through the primary winding of said transformer.

11. The switched-mode power supply of claim 10 wherein current flowing through the primary winding of said transformer is sensed by a resistor coupled between said first semiconductor switch and circuit ground.

12. The switched-mode power supply of claim 10 wherein said controller circuit includes a dimming-control input-pin and the switched-mode power supply includes dimming control means for applying a signal to the dimming-control input-pin for increasing or decreasing average current flowing through the primary winding of said transformer.

13. The switched-mode power supply of claim 12 wherein the dimming control means includes a variable resistor coupled between the dimming-control input-pin and circuit ground.

14. The switched-mode power supply of claim 1 wherein said controller circuit includes a dimming-control input-pin and the switched-mode power supply includes means for applying a signal to the dimming-control input-pin for increasing or decreasing average current flowing through the primary winding of said transformer.

15. The switched-mode power supply of claim 14 wherein the dimming control means includes a variable resistor coupled between the dimming-control input-pin and circuit ground.

16. The switched-mode power supply of claim 1 wherein said controller circuit includes a duty-cycle limiting-means for restricting the duty cycle of said first semiconductor switch to less than a pre-established maximum value.

17. The switched-mode power supply of claim 16 wherein the maximum value that the duty-cycle limiting-means restricts the duty cycle of said first semiconductor switch is sixty-seven percent.

18. The switched-mode power supply of claim 1 wherein said first semiconductor switch and said second semiconductor switch are metal-oxide-silicon field effect transistors ("MOSFETs").

19. The switched-mode power supply of claim 1 wherein the first principal terminal of said second semiconductor switch connects to the second end of said transformer, and the second terminal of said capacitor connects to the second principal terminal of said first semiconductor switch.

20. The switched-mode power supply of claim 1 wherein the core of said transformer has linear magnetic permeability.

* * * * *